Oct. 14, 1958

J. T. GATES 2,855,792

BALL SCREW AND NUT CONSTRUCTION

Filed June 20, 1955

INVENTOR.
JAMES T. GATES
BY
*John C. Renfer*
ATTORNEY

Oct. 14, 1958

J. T. GATES 2,855,792

BALL SCREW AND NUT CONSTRUCTION

Filed June 20, 1955

INVENTOR.
JAMES T. GATES
BY
ATTORNEY

United States Patent Office 2,855,792
Patented Oct. 14, 1958

2,855,792
BALL SCREW AND NUT CONSTRUCTION

James T. Gates, Cleveland Heights, Ohio, assignor to Cleveland Pneumatic Industries, Inc., a corporation of Ohio Application June 20, 1955, Serial No. 516,625

7 Claims. (Cl. 74—459)

This invention relates generally to antifriction screw mechanisms and more particularly to a new and improved molded ball screw and nut structure.

It is an important object of this invention to provide an antifriction screw and nut structure wherein the nut may be molded.

It is another important object of this invention to provide an antifriction nut structure incorporating a ball recirculating means which may be molded.

It is still another important object of this invention to provide an antifriction nut provided with a recirculating means for the antifriction members which is partially formed in the surface of the nut and partially formed by a cooperating cover member.

It is still another object of this invention to provide an antifriction nut which may be completely molded by high production, low cost molding methods.

It is still another object of this invention to provide an antifriction nut formed of a plastic, preferably nylon.

Further objects and advantages will appear from the following description and drawings, wherein.

Conventional ball screw mechanisms provide a U-shaped return tube to recirculate the balls between the ends of the nut and form a closed circuit. Such U-shaped tubes are difficult to manufacture since they generally require bending of the tube around two substantially right angles. Since ball screw mechanisms require precision dimensional tolerances, the tendency of the tube to flatten at the bend creates a great deal of difficulty and increases the manufacturing cost. Because of the U-shaped form of the conventional ball return tube, low cost production methods of manufacture such as molding have not been utilized. Again, in the manufacture of the nut itself, it has been necessary in the past to tap or grind the internal threads. This, of course, entails expensive machinery and increases the unit cost of the finished item. By utilizing the preferred structure disclosed, it is possible to produce precision ball screw nuts by the use of high production, low cost molding methods of manufacture.

Preferably a nut, according to this invention, is molded of plastic such as nylon. However, other suitable material susceptible to molding techniques may be utilized.

Figure 1:
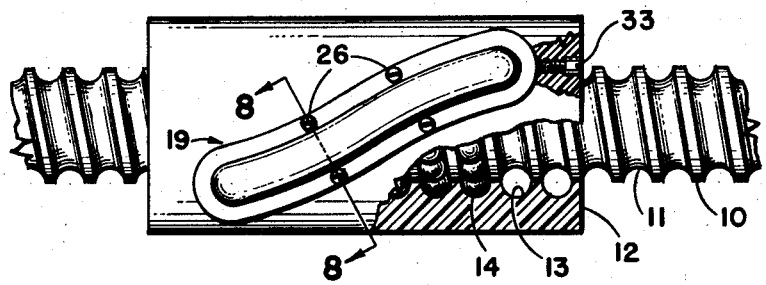
Figure 1 is a side elevation partially in longitudinal section of the assembled ball screw and nut according to this invention.

Referring to the drawings, Figure 1 discloses an assembled ball screw and nut which provides a screw 10 formed with a helical groove 11 which projects through a nut 12 formed with a helical groove 13. The grooves 11 and 13 cooperate to define a helical channel filled with balls 14 which interconnect the nut and screw in the conventional manner to provide relative axial motion therebetween when there is relative rotational motion between the nut and the screw.

Figure 2:
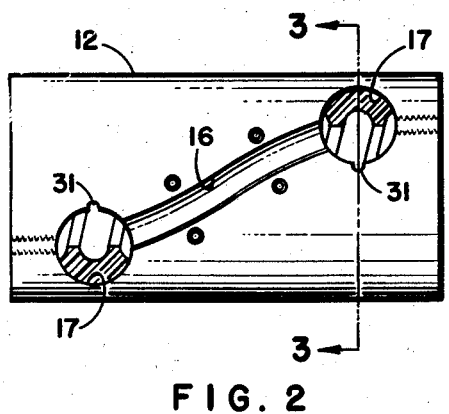
Figure 2 is a side elevation of the nut with the ball recirculating cover removed.
Figure 3:
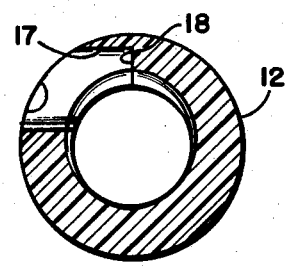
Figure 3 is a cross section taken along 3—3 of Figure 2.
Figure 4:
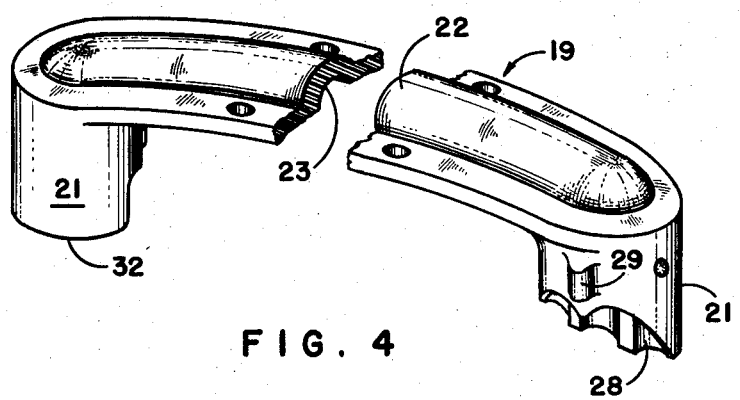
Figure 4 is an enlarged perspective view of the recirculating cover.
Figure 5:
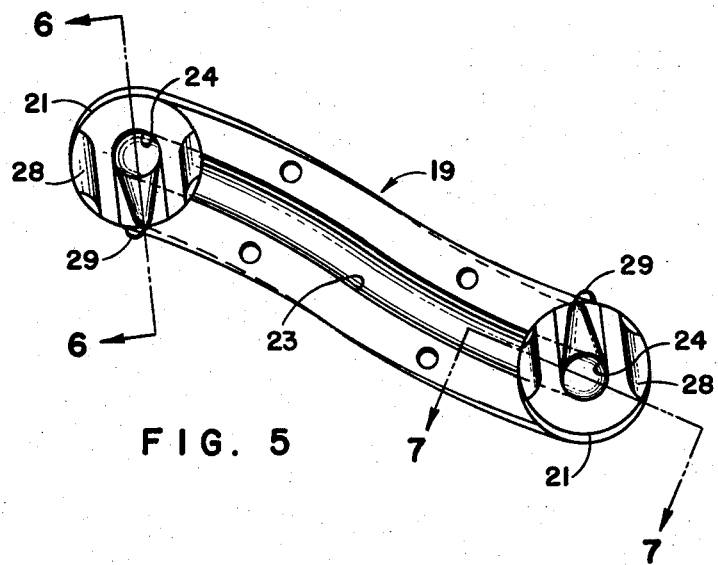
Figure 5 is a view showing the structural detail of the ball recirculating cover.

It is necessary to provide recirculating means connecting the ends of the ball channel so that an endless circuit of balls is contained within the nut. To provide this recirculating passage, I form a semicircular groove 16 diagonally along the exterior of the nut 12 so that it connects two openings 17 which extend from the circumference of the nut into the grooved portion. This structure is best shown in Figures 2 and 3. The openings 17 extend into the grooved portion of the nut and terminate at an end wall 18 perpendicular to the axis of the openings 17 and contained in a plane through the axis of the nut.

Figures 6, 7:
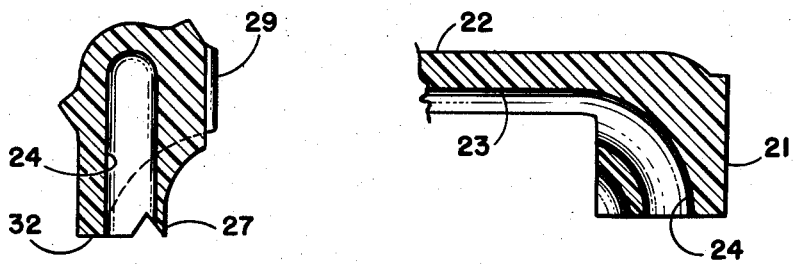
Figure 6 is a fragmentary section taken along 6—6 of Figure 5.
Figure 7 is a fragmentary section taken along 7—7 of Figure 5.
Figure 8:
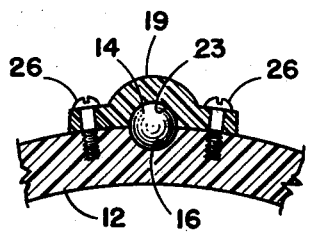
Figure 8 is a fragmentary section taken along 8—8 of Figure 1.

A recirculating groove cover member 19 (shown in Figures 4 through 7) is formed with projecting end portions 21 adapted to fit into the openings 17 and a central portion 22 formed with a semicircular groove 23 which cooperates with the groove 16 to define a ball recirculating passage of circular cross section. The cooperation between the grooves 23 and 16 is best shown in Figure 8. Each projecting end portion 21 is formed with ball passages 24 which blends into the channel defined by the grooves 11 and 13 at one end and into the passage formed by the grooves 16 and 23 at the other end. Therefore, when the cover member 19 is mounted on the nut 12 by means of screws 26 or the like, a continuous ball circuit is provided by the cooperating grooves 11 and 13, the passages 24 and the cooperating grooves 16 and 23. The projecting end portions 21 are also formed with deflecting fingers 27, best shown in Figure 6, which project into the path of the balls within the channel defined by the grooves 11 and 13 and deflect the balls from the channel into the associated passage 24 when the screw and nut are rotated. The ends of the end portions 21 are also formed with semicircular grooves 28 which cooperate with the groove 13 when the cover member 19 is mounted on the nut to fill in the portion of the groove 13 which would normally be within the area of the openings 17. Alignment lugs 29 may be formed on the projecting end portions 21 to cooperate with alignment grooves 31 formed in the wall of the openings 17 to insure proper orientation of the projecting end portions 21 when they are positioned within the nut openings. Also the end wall 32 of the projecting end portions 21 are adapted to seat against the end walls 18 of the openings 17 for the same reason. Set screws 33 may be threaded into the ends of the nut 12 to lock the end portions 21 in position after the nut elements are assembled.

By utilizing the structure disclosed, it is possible to use molding techniques to manufacture the nut and return means because the central portion 22 of the cover member 19 is open so that a U-shaped core need not be used. It is merely necessary in the molding of the cover member 19 to provide two cores, one for each of the passages 24 wherein the cores provide a right angle bend. The passages 24 are formed with a continuous uniform bend so that the core may be easily withdrawn. Also in the molding of the nut 12, if a slightly flexible plastic such as nylon is utilized, it is possible to draw the core used to form the groove 13 by threading it out of the nut without the necessity of providing draft in the core. This is quite important since the groove 13 should be accurately formed with a uniform size and shape throughout its length.

The use of ball screw nuts formed of a plastic material such as nylon has beeen found satisfactory when the loads carried by the device are maintained at levels compatible with the streength of the plastic material. It has been found in actual practice that nylon nuts used in ball screw devices have efficiencies ranging above 75%. Because of the good wearing qualities of nylon and its ability to operate with essentially no lubrication, it is particularly desirable for use in installations wherein extended use is required without service or inspections. Also because nylon is somewhat flexible, minor variations in the uniformity of the grooves 11 and 13 will not result in a concentration of load on a few of the balls but rather will permit slight deflections so that the balls will all carry their share of the load.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. An antifriction nut adapted to cooperate with a helically grooved screw comprising a tubular nut body formed with an internal helical groove having a radius of curvature and an external groove radially spaced from said internal groove and having a radius of curvature substantially equal to the radius of curvature of said internal groove extending lengthwise of said body, a cover member mounted thereon formed with a groove having a radius of curvature substantially equal to the radius of curvature of said external groove cooperating with said external groove to define a recirculating passage of circular section, and a connecting means between said recirculating passage and helical groove.

2. An antifriction unit adapted to cooperate with a grooved element comprising a tubular body formed with an internal groove having a radius of curvature and an external groove radially spaced from said internal groove and having a radius of curvature substantially equal to the radius of curvature of said internal groove extending lengthwise of said body, and a cover member mounted thereon providing a central portion formed with a groove having a radius of curvature substantially equal to the radius of curvature of said external groove cooperating with said external groove to define a recirculating passage and laterally extending end portions positioned in opening formed through the wall of said body, said end portions providing passages connecting the ends of said internal groove and said recirculating passage.

3. An antifriction nut adapted to cooperate with a helically grooved screw comprising a tubular nut body formed with an internal helical groove having a radius of curvature and an external groove radially spaced from said internal groove and having a radius of curvature substantially equal to the radius of curvature of said internal groove extending lengthwise of said body, and a molded cover member mounted thereon providing a central portion formed with a groove having a radius of curvature substantially equal to the radius of curvature of said external groove cooperating with said external groove to define a recirculating passage of circular section and laterally extending end portions positioned in opening formed through the wall of said body, said end portions providing passages having a uniform curve throughout their length connecting the ends of said helical groove and said recirculating passage.

4. An antifriction screw and nut comprising a screw formed with a helical groove, a tubular nut body around said screw formed with an internal helical groove having a radius of curvature cooperating with said screw groove to define a helical channel, a plurality of antifriction elements in said channel interconnecting said nut body and screw whereby relative rotation therebetween provides relative axial motion, said nut body being formed with an external groove radially spaced from said internal groove having a radius of curvature substantially equal to the radius thereof and an opening at each end thereof extending through the wall of said nut body to the helical groove thereof, and a cover member mounted on said nut body formed with a groove having a radius of curvature substantially equal to the radius of curvature of said external groove cooperating with said external groove to define a passage adapted to recirculate said antifriction units between the ends of said channel.

5. An antifriction screw and nut comprising a screw formed with a helical groove, a tubular nut body around said screw formed with an internal helical groove having a radius of curvature cooperating with said screw groove to define a helical channel and an external groove radially spaced from said internal groove having a radius of curvature substantially equal to the radius thereof, a plurality of antifriction elements in said channel interconnecting said nut body and screw whereby relative rotation therebetween provides relative axial motion, a cover member mounted on said nut body formed with a groove having a radius of curvature substantially equal to the radius of curvature of said external groove cooperating with said external groove to define a recirculating passage, and connecting means between said recirculating passage and helical channel cooperating therewith to define a closed circuit of antifriction members.

6. An antifriction screw and nut comprising a screw formed with a helical groove, a tubular nut body around said screw formed with an internal helical groove having a radius of curvature cooperating with said screw groove to define a helical channel, a plurality of antifriction elements in said channel interconnecting said nut body and screw whereby relative rotation therebetween provides relative axial motion, said nut body being formed with an external groove radially spaced from said internal groove having a radius of curvature substantially equal to the radius thereof and an opening at each end thereof extending through the wall of said nut body to the helical groove thereof, and a cover member mounted on said nut body formed with a groove having a radius of curvature substantially equal to the radius of curvature of said external groove cooperating with said external groove to define a recirculating passage and connecting means between said recirculating passage and helical channel cooperating therewith to define a closed circuit of antifriction members.

7. An antifriction screw and nut comprising a screw formed with a helical groove, a tubular nut body around said screw formed with an internal helical groove having a radius of curvature cooperating with said screw groove to define a helical channel, a plurality of antifriction elements in said channel interconnecting said nut body and screw whereby relative rotation therebetween provides relative axial motion, said nut body being formed with an external groove radially spaced from said internal groove having a radius of curvature substantially equal to the radius thereof and an opening at each end thereof extending through the wall of said nut body to the helical groove thereof, and a cover member mounted on said nut body formed with a groove having a radius of curvature substantially equal to the radius of curvature of said external groove cooperating with said external groove to define a recirculating passage and laterally extending end portions positioned in said openings providing passages having a uniform curve throughout its length connecting the ends of said channel and recirculating passage, said nut body and cover member being molded of plastic material.

References Cited in the file of this patent

UNITED STATES PATENTS

| | | |
|---|---|---|
| 2,444,886 | Vickers | July 6, 1948 |
| 2,519,777 | Mill | Aug. 22, 1950 |
| 2,581,482 | Hawkins | Jan. 8, 1952 |
| 2,673,473 | Phelps | Mar. 30, 1954 |

FOREIGN PATENTS

| | | |
|---|---|---|
| 697,706 | Great Britain | Sept. 30, 1953 |